(12) United States Patent
Yamauchi et al.

(10) Patent No.: US 8,007,148 B2
(45) Date of Patent: Aug. 30, 2011

(54) VEHICULAR ILLUMINATION DEVICE

(75) Inventors: Atsushi Yamauchi, Utsunomiya (JP); Hidekazu Hayakawa, Mooka (JP)

(73) Assignee: Honda Access Corp., Niiza-shi, Saitama (JP)

( * ) Notice: Subject to any disclaimer, the term of this patent is extended or adjusted under 35 U.S.C. 154(b) by 0 days.

(21) Appl. No.: 12/729,670

(22) Filed: Mar. 23, 2010

(65) Prior Publication Data

US 2010/0271837 A1    Oct. 28, 2010

(30) Foreign Application Priority Data

Apr. 28, 2009  (JP) ................................. 2009-110098

(51) Int. Cl.
F21V 33/00    (2006.01)
(52) U.S. Cl. ........................ 362/501; 362/495
(58) Field of Classification Search ................. 362/501, 362/495
See application file for complete search history.

(56) References Cited

U.S. PATENT DOCUMENTS

| | | | | |
|---|---|---|---|---|
| 1,395,039 A * | 10/1921 | Chmurski | ..................... | 362/495 |
| 2,010,374 A * | 8/1935 | Pissis | ........................... | 362/495 |
| 2,036,435 A * | 4/1936 | Phelps | .......................... | 362/487 |
| 2,081,899 A * | 6/1937 | Bridge | ........................... | 362/495 |
| 2,901,593 A * | 8/1959 | McNally | ................... | 362/501 |
| 6,158,869 A * | 12/2000 | Barnes, Jr. | ..................... | 362/86 |
| 6,416,209 B1 * | 7/2002 | Abbott | .......................... | 362/506 |
| 2007/0274087 A1 * | 11/2007 | Herold | ......................... | 362/516 |

FOREIGN PATENT DOCUMENTS

| | | |
|---|---|---|
| DE | 43 05 653 A1 | 3/1994 |
| DE | 10-2006-035521 A1 | 2/2008 |
| EP | 1 743 801 A1 | 1/2007 |
| EP | 1 864 890 A3 | 3/2007 |
| EP | 1 864 890 A2 | 12/2007 |
| FR | 2 886 373 A1 | 12/2008 |
| JP | 64-065297 A | 3/1989 |
| JP | 3-15753 U | 2/1991 |
| JP | 2005-075161 A | 3/2005 |
| JP | 2005-138766 A | 6/2005 |
| JP | 2005-170130 A | 6/2005 |

OTHER PUBLICATIONS

United Kindgom Search Report dated Jul. 1, 2010, issued in corresponding United Kindgom Patent Application No. GB1004991.4.
Office Action dated Mar. 7, 2011 in corresponding Japanese application No. 2009-110098.

* cited by examiner

Primary Examiner — Laura Tso
(74) Attorney, Agent, or Firm — Westerman, Hattori, Daniels & Adrian, LLP

(57) ABSTRACT

In a vehicular illumination device which illuminates a lower part around an opened part of a door at a side of a vehicle, a side sill garnish is provided below the door-opened part, and a lamp and a lamp garnish which retains the lamp are arranged on a lower face of the side sill garnish. As the lamp is retained by the lamp garnish, the lamp can efficiently and appropriately illuminate an underfoot floor when a person rides on and off the vehicle. Moreover, the lamp garnish has a recess, and an edge which is provided around an opened part of the recess. As the lamp is arranged in the recess, the lamp is not visually recognized directly from the exterior of edge parts, thereby preventing a following vehicle from falsely recognizing the lamp as a backup lamp.

14 Claims, 11 Drawing Sheets

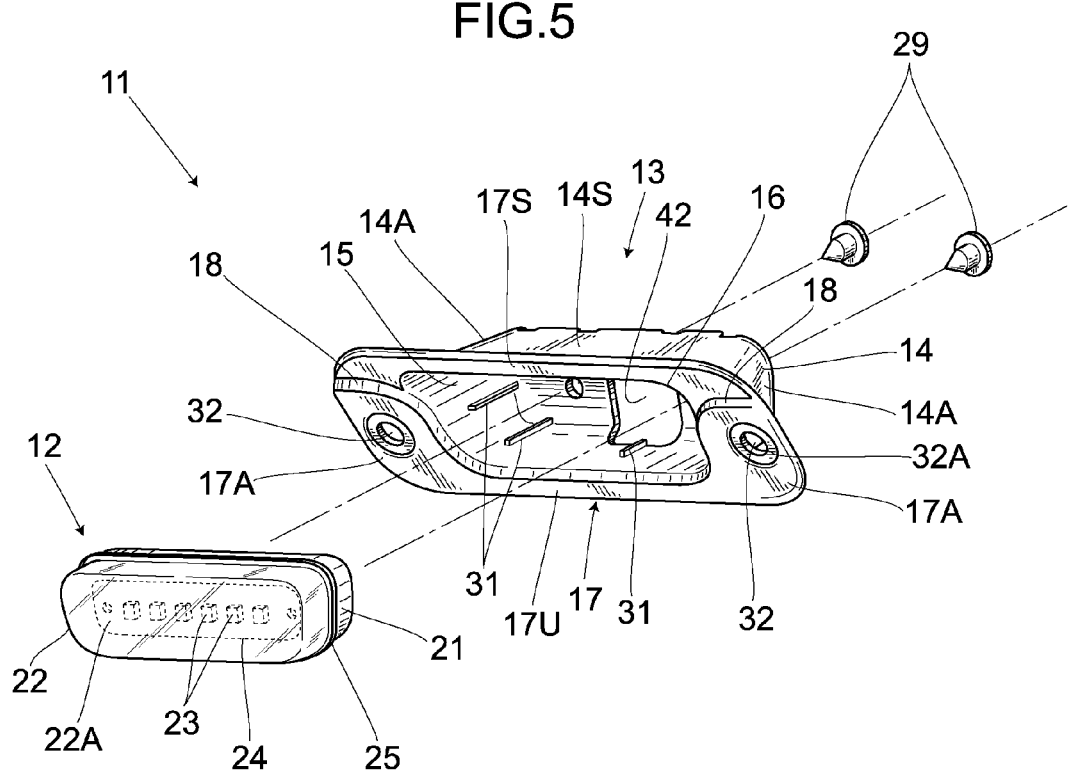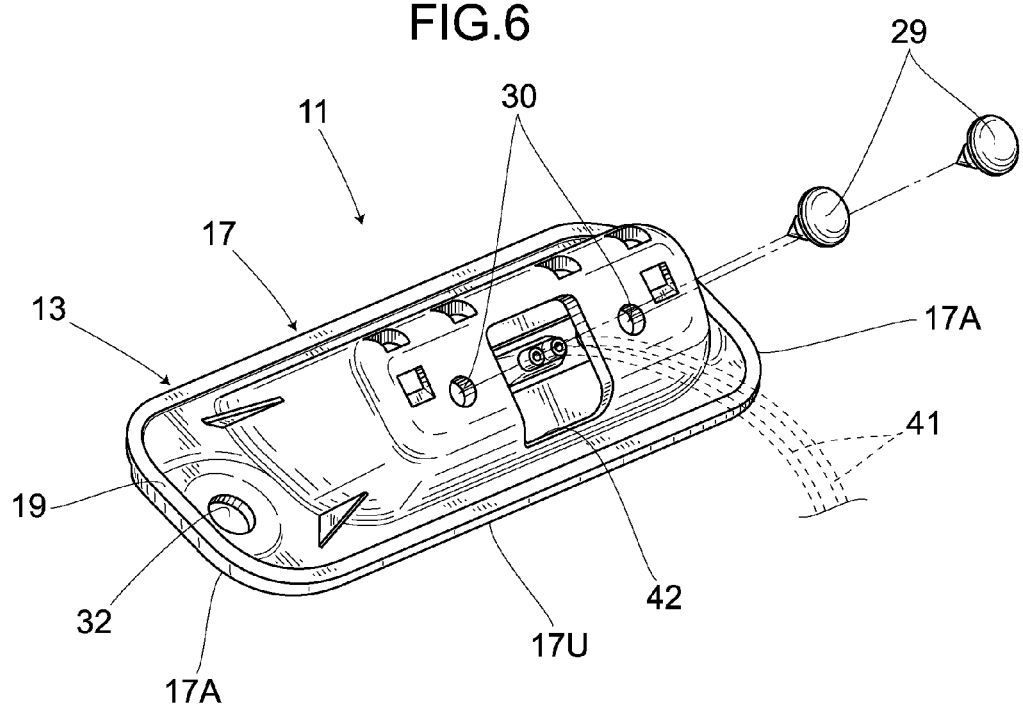

US 8,007,148 B2

VEHICULAR ILLUMINATION DEVICE

BACKGROUND OF THE INVENTION

1. Field of the Invention

The present invention relates to a vehicular illumination device which illuminates a lower part around a door-opened part at a side of a vehicle.

2. Description of the Related Art

Japanese Utility Model Application Laid-open Publication No. H03-15753 discloses, as a conventional vehicular illumination device provided at a side of a vehicle, a vehicular lamp which has a lamp unit arranged at a lower end of a side panel to illuminate the lower part of the side of an automobile. Japanese Patent Application Laid-open Publication No. S64-65297 also discloses a vehicular underfoot illumination device which comprises a main body formed of an elastic material having a latching flange and a latching hook, and an LED. The main body is pressed in an existing hole from a bottom-face side and the whole device is caught by the latching flange and the latching hook at the front-face side.

SUMMARY OF THE INVENTION

According to the foregoing vehicular lamp, because the lens of the lamp unit is protrudingly provided, emitted light spread in a wide range, so that it is difficult to illuminate an underfoot floor efficiently. Moreover, a blanket is attached from the internal side of the side panel, a mounting hole of the side panel is exposed, resulting in a poor external design. Furthermore, according to the foregoing vehicular underfoot illumination device, there is no other choice that the main body of an underfoot illuminating lamp is left exposed.

Moreover, according to both conventional technologies, light leak to the surroundings at the time of illumination, so that the light is visually recognized by a vehicle coming from an opposite direction and a following vehicle. In the case of the following vehicle, it is concerned that the leaking light may be falsely recognized as a backup lamp.

The present invention has been made in view of the foregoing problems, and it is an object of the present invention to provide a vehicular illumination device which can efficiently and appropriately illuminate an underfoot floor when a person rides on and off a vehicle. It is another object of the present invention to provide an illumination device which can prevent a following vehicle from falsely recognizing as a backup lamp.

To achieve the objects, according to a first aspect of the present invention, there is provided a vehicular illumination device which illuminates a lower part around a door-opened part at a side of a vehicle, wherein an external component is provided below the door-opened part, and a lamp and a lamp garnish which retains the lamp are arranged on a lower face of the external component.

The lamp garnish may include a recess, and an edge part formed around an opened part of the recess, the lamp may be arranged in the recess and a light-emission face of the lamp may be arranged inwardly of a face between the edge parts.

A position of the edge part at an external side of the vehicle is higher than a position of the edge part at an internal side of the vehicle in a state held on the lower face of the external component.

A light-emission unit of the lamp may be so arranged as to be inclined toward an exterior of the vehicle.

A light-emission unit of the lamp may have an inclination angle adjustable relative to the lamp garnish.

A light-emission unit may have a clearance between a face of the edge parts and the light-emission units adjustable.

A shielding part may be provided on the edge part.

The lamp may comprise a casing, a translucent cover which is attached to the casing, and the light-emission unit which is attached in the casing.

According to the vehicular illumination device, as the lamp garnish is arranged on the lower face of the external component, and the lamp is retained by the lamp garnish, the lamp can efficiently and appropriately illuminate an underfoot floor when a person rides on and off the vehicle.

BRIEF DESCRIPTION OF THE DRAWINGS

FIG. 5 is an exploded perspective view of the first embodiment;

FIG. 6 is a perspective view of the first embodiment;

DETAILED DESCRIPTION OF THE PREFERRED EMBODIMENTS

Figure 1:
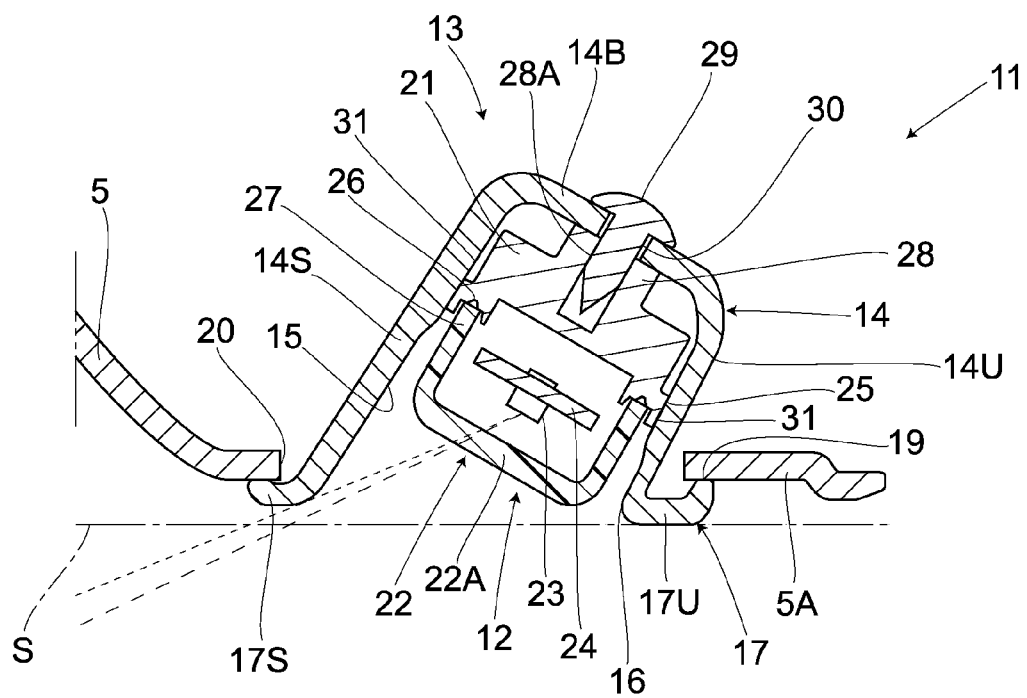
FIG. 1 is a cross-sectional view showing an attached state according to a first embodiment.

Preferred embodiments of the present invention will be explained with reference to the accompanying drawings.

First Embodiment

An explanation will be given of a first embodiment of the present invention with reference to the accompanying drawings. As shown in FIG. 1 to FIG. 7, a vehicle 1 has an opened part 3 for a door 2 at a side part. A side sill garnish 5 which is an external component is provided at a vehicle body part 4 below the opened part 3. Note that the opened part 3 is an entrance of the vehicle.

A vehicular illumination device 11 is provided on a lower face 5A of the side sill garnish 5, and comprises a lamp 12, and a resin-made lamp garnish 13 retaining the lamp 12. Note that the vehicular illumination device 11 of the present invention is a paddle light.

As shown in FIG. 1, etc., the lamp garnish 13 comprises a main body 14 formed in a box shape having an a lower part opened, a recess 15 which is formed by the internal face of the main body 14 and which is inclined at an angle of substantially 30 degrees so that the lower part is directed to the exterior of the vehicle 1 relative to a vertical axis, and an edge 17 which is provided around an opened part 16 of the recess 15 and which is provided integrally with the main body 14. The recess 15 is so formed as to be long in a direction back and forth of the vehicle 1 and as to have a length short in the width direction of the vehicle 1, and the opened part 16 is formed in a substantially-rectangular shape. The main body 14 has front and rear side wall parts 14A and 14A, a bottom wall part 14B, a vehicle external side wall part 14S, and a vehicle internal side wall part 14U all formed in tabular shapes, respectively. These side wall parts 14A, 14A, 14S and 14U form the recess 15 together. Note that, S in the drawings represents a horizontal line.

Figure 2:
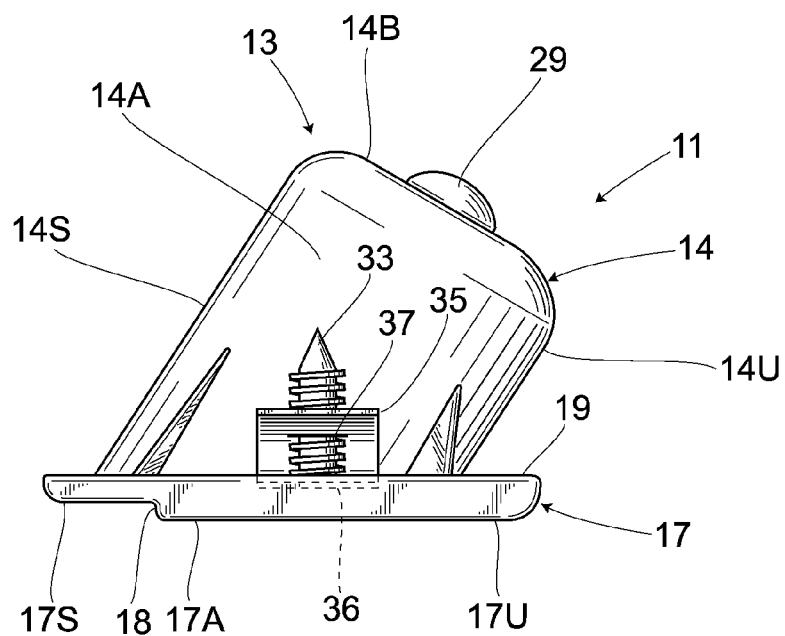
FIG. 2 is a front view of the first embodiment.
Figure 3:
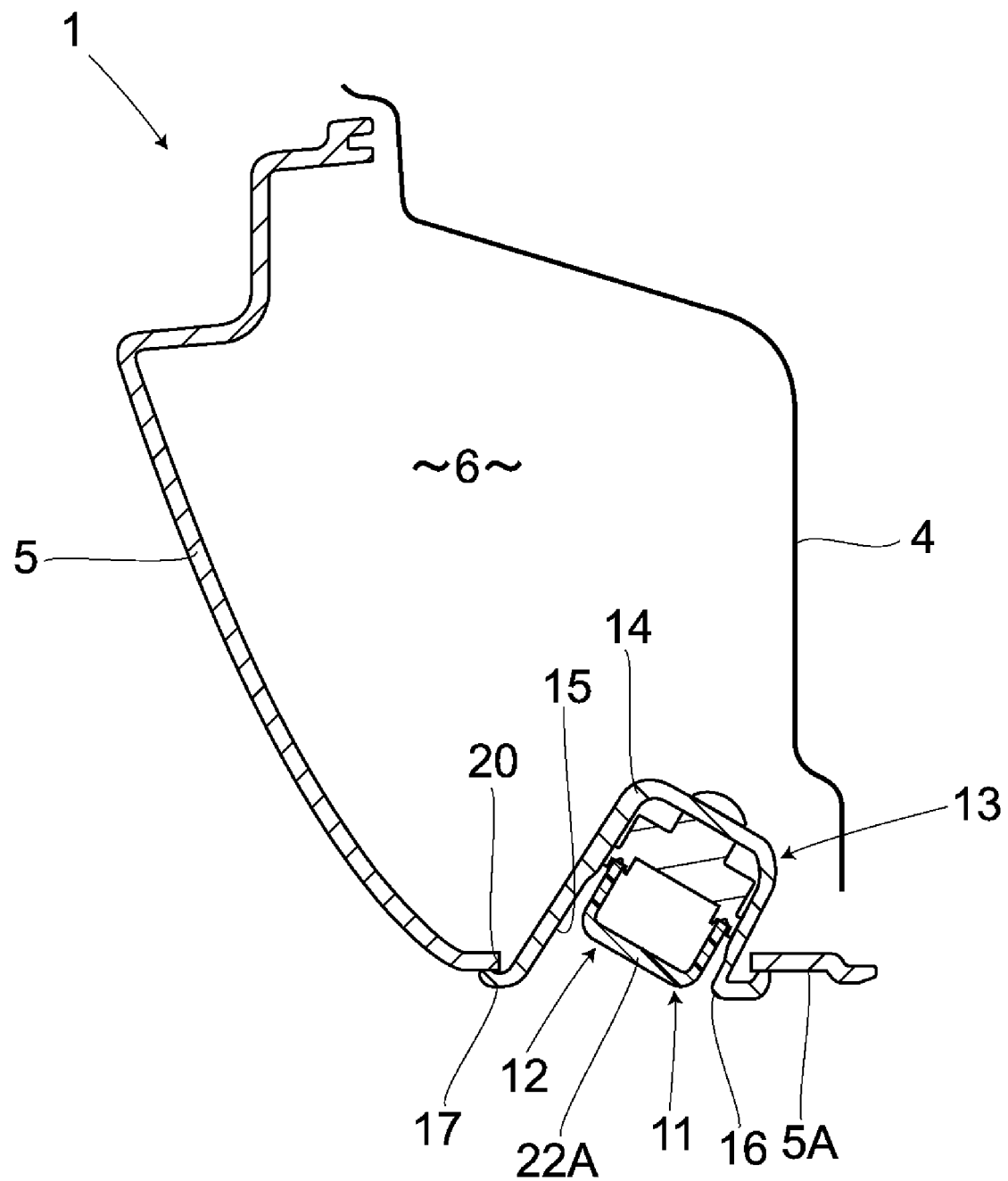
FIG. 3 is a cross-sectional view of the first embodiment.
Figure 4:
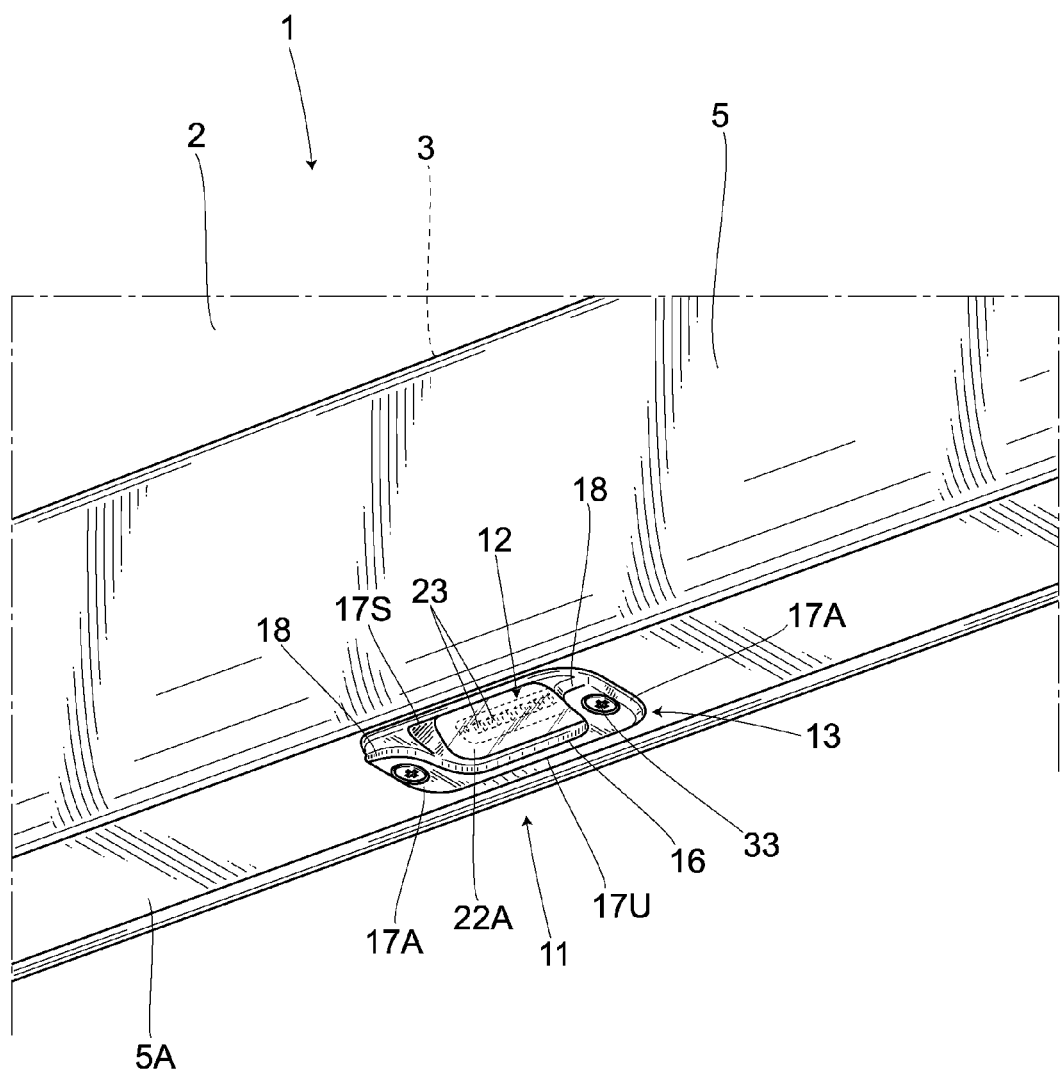
FIG. 4 is a perspective view showing the attached state according to the first embodiment.

Moreover, the edge 17 of the lamp garnish 13 comprises a front side edge part and a rear side edge part 17A and 17A in the front of the vehicle and in the rear thereof, respectively, and external side edge parts 17S and 17U at the external side of the vehicle and at the internal side thereof, respectively. As shown in FIG. 2, FIG. 4, etc., formed on the front face of the edge 17 (bottom face in an attached state) at the vehicle-external sides of the front and rear edge parts 17A, 17A are steps 18 and 18, and an abutting part 19 which protrudes backwardly is formed around the edge 17.

Figure 7:
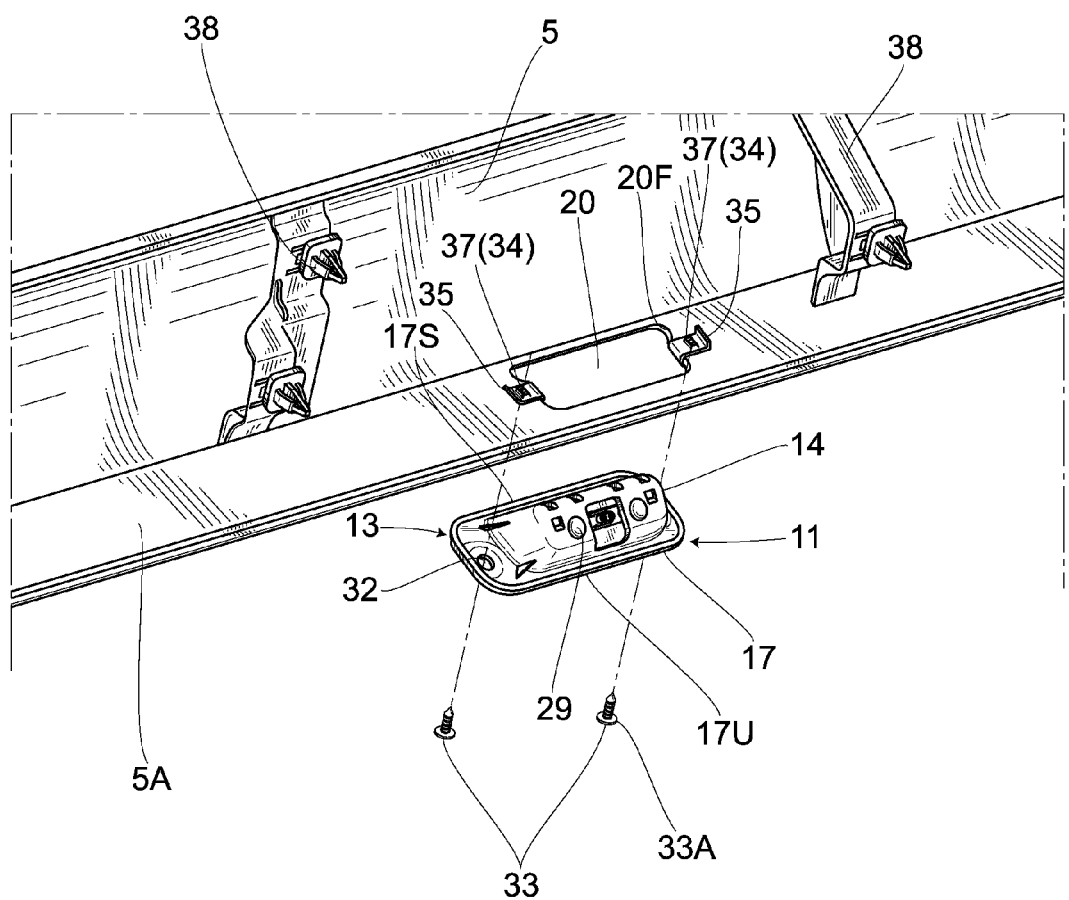
FIG. 7 is an exploded perspective view for explaining how to attach according to the first embodiment.

The lamp garnish 13 is attached into a mounting hole 20 formed in the lower face 5A of the side sill garnish 5. More specifically, in an attached state shown in FIG. 1, FIG. 4, etc., as shown in FIG. 7, the main body 14 is inserted in the mounting hole 20 from underneath and is attached with the abutting part 19 abutting the lower face 5A. In this attached state, the height position of the external side edge part 17S is so formed as to be higher than that of the internal side edge part 17U, and the difference in height is inherent to the step 18. Note that, as shown in FIG. 6, in the attached state of the side sill garnish 5, a retaining space 6 for retaining the main body 14 thereinside is provided between the internal face of the side sill garnish 5 and the vehicle body part 4.

The lamp 12 comprises a casing 21 made of a synthetic resin, a translucent cover 22 which is made of a synthetic resin and which is attached to the top part of the casing 21, and LEDs 23 which are light-emission units attached in the casing 21. As shown in FIG. 5, etc., a plurality of LEDs 23, 23, etc., are attached on a substrate 24 side by side in the direction back and forth of the vehicle. Note that a lens face 22A which is a light-emission face is formed at the front part of the translucent cover 22. Moreover, the LEDs 23 are electrically connected to the substrate 24. Furthermore, a fitting receiving part 26 is provided at an opened edge part 25 of the casing 21, a fitting edge part 27 which fits into the fitting receiving part 26 is provide at the translucent cover 22, and an opened edge part 25 expands toward the exterior. The fitting edge part 27 is fitted into the fitting receiving part 26, and is fixed by means of an adhesive or the like as needed. Note that the direction of the LED 23 is substantially same as that of the recess 15, and the direction of the lens face 22A is substantially perpendicular to that of the LED 23.

Moreover, as shown in FIG. 1, etc, a plurality (two) of mounting seats 28 and 28 protrudingly provided on the bottom part of the casing 21 with a clearance in the direction back and forth of the vehicle, and the mounting seats 28, 28 are provided with respective screw holes 28A and 28A through which a screw 29 is screwed. Through-holes 30 and 30 are formed in the bottom wall part 14B of the main body 14 correspondingly to the screw holes 28A and 28A. As the screw 29 inserted into the through-hole 30 is screwed into the screw hole 28A, the lamp 12 is fixed to the main body 14. Note that, although a threaded part is formed in the screw hole 28A as the screw 29 is screwed therein, such a threaded part may be formed beforehand. Moreover, as shown in FIG. 1 and FIG. 5, formed on the internal face of the vehicle external side wall part 14S and that of the vehicle internal side wall part 14U with a clearance in the direction back and forth of the vehicle are a plurality of rib parts 31 and 31 in the vertical direction. As the rib parts 31 and 31 are formed in the vertical direction on the internal face of the front side wall part 14A and that of the rear side wall part 14A, and the opened edge part 25 is pressed in between the rib parts 31, 31, etc., the lamp 12 is positioned relative to the lamp garnish 13.

As is clear from FIG. 1 and FIG. 2, at least a part of the step 18 is positioned outwardly of the vehicle relative to the lens face 22A of the translucent cover 22 of the lamp 12, and the lens face 22A is positioned inwardly of the recess 15 relative to a face between the front and rear edge parts 17A and 17A. That is, in the attached state, the lens face 22A is positioned above the lower face of the front and rear edge parts 17A and 17A, and the lamp 12 is retained in the recess 15.

Consequently, the lens face 22A is not visually recognized directly from at least the front and rear of the vehicle 1, so that it can prevent a following car from falsely recognizing the lamp 12 as a backup lamp.

As shown in FIG. 5, etc., through-holes 32 and 32 are formed in the front side edge part 17A and the rear side edge part 17A, respectively. Formed at the external-face side of the through-hole 32 is a recess 32A which retains a head part 33A of a screw 33. Moreover, as shown in FIG. 7, screw inserting holes 34 and 34 are formed in the direction back and forth of the vehicle at an edge part 20F of the mounting hole 20 of the side sill garnish 5. The edge part 20F of the screw inserting hole 34 is held by a washer 35 which is a metal plate bent in a shape like a rectangle with one side opened. The washer 35 has a through-hole 36 formed in the external side panel part thereof and has a hole 37 formed in the internal side panel part thereof, and the screw 33 is screwed into the hole 37. Note that if the hole 37 is so formed as to be smaller than the screw 33, the screw 33 cuts into the hole 37 when screwed therein, and can be surely fixed.

Consequently, the lamp garnish 13 can be fixed into the mounting hole 20 by positioning the through-hole 32 of the edge part 20F with the through-hole 36 of the washer 35 with the edge part 20F of the mounting hole 20 being held by the washer 35, and by inserting the screw 33 loosely into the through-hole 32, the through-hole 36, and the screw inserting hole 34 so as to make the screw 33 threaded into the hole 37 and to hold the edge part 20F by the washer 35. In this state, the mounting hole 20 is covered by the edge 17 and is not visually recognized from the exterior.

Note that, in FIG. 7, reference numerals 38 are fixing members for fixing the side sill garnish 5 to the vehicle body part 4. The illumination device 11 is arranged between the fixing members 38 and 38 provided in the direction back and forth of the vehicle with a clearance.

Moreover, as shown in FIG. 6, cables 41 are electrically connected to the substrate 24, and lighting-up of the LEDs 23 is controlled through the cables 41 by an in-vehicle power supply or the like. Note that an inserting hole 42 through which the cables 41 are inserted is opened in the side of the bottom wall part 14B of the main body 14.

As explained above, according to the first embodiment, correspondingly to claim 1, in the vehicular illumination device which illuminates the lower part around the opened part 3 for the door 2 at the side of the vehicle, as the side sill garnish 5 which is the external component is provided below the door-opened part 3, and as the lamp 12 and the lamp garnish 13 which retains the lamp 12 are arranged on the lower face 5A of the side sill garnish 5, the lamp 12 can efficiently and appropriately illuminate an underfoot floor when a person rides on and off the vehicle 1 as the lamp 12 is held by the lamp garnish 13.

Moreover, according to the first embodiment, correspondingly to claim 2, the lamp garnish 13 has the recess 15, and the edge parts 17A, 17A, 17S, and 17U all provided around the opened part 16 of the recess 15. As the lens 22A which is the light-emission face of the lamp 12 is arranged inwardly relative to the lower face between the edge parts 17A and 17A and the lamp 12 is arranged in the recess 15, the lamp 12 is hidden by the edge parts 17A and 17A holding the lamp 12, so that it is not possible to visually recognize the lamp 12 directly from the exterior of the edge parts 17A and 17A, thereby preventing a following car from falsely recognizing the lamp 12 as a backup lamp.

Furthermore, according to the first embodiment, correspondingly to claim 3, as the position of the edge part 17S at the exterior of the vehicle is higher than that of the edge part 17U at the interior of the vehicle in a state held on the lower face 5A of the side sill garnish 5 which is the external component, an illumination range can be expanded toward the exterior of the vehicle.

Still further, according to the first embodiment, correspondingly to claim 4, the LEDs 23 which are the light-emission units of the lamp 12 are so arranged as to be inclined to the exterior of the vehicle 1, it is possible to widely illuminate the exterior of the vehicle. The light-emission units of the lamp are so arranged as to be inclined to the exterior of the vehicle.

Yet further, as an effect of the first embodiment, the plurality of through-holes 32 and 32 are formed in the edge 17, the screw inserting holes 34 and 34 are formed in the mounting hole 20 to which the side sill garnish 5 is attached, and the edge part 20F of the screw inserting holes 34 is held by the washer 35 which is the metal plate bent in a shape like a rectangle with one side opened, so that the lamp garnish 13 can be easily attached to the washer 35 and the edge part 20F with screw 33 Moreover, as the lower face 5A of the side sill garnish 5 is substantially horizontal and flat, and the lamp garnish 13 having the recess 15 is used, it is not necessary to form a concavity and convexity on the lower face 5A.

Second Embodiment

Figure 8:
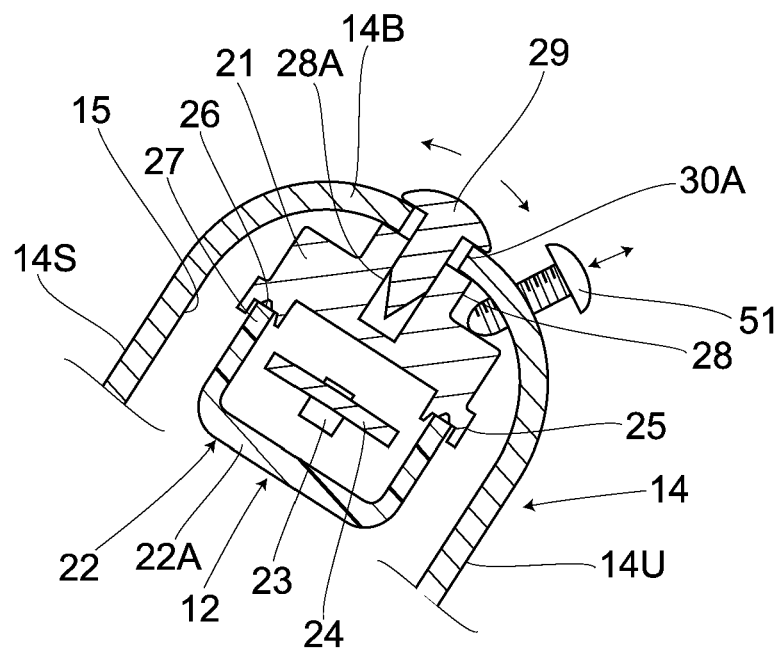
FIG. 8 is a cross-sectional view showing an essential part in an attached state according to a second embodiment.

FIG. 8 shows a second embodiment of the present invention. The same structural element will be denoted by the same reference numeral as that of the first embodiment, and the duplicated explanation thereof will be omitted. In the second embodiment, an internal face of the bottom wall part 14B of the lamp garnish 13 is formed in a circular shape, and correspondingly to this form, a leading-end face of the mounting seat 28 of the lamp 12 is formed in a circular shape by a vehicle-in-and-out technique. A through-hole 30A of the bottom wall part 14B is formed in a long-hole shape. An angle of the lamp 12 relative to the vertical axis is adjustable by moving the screw 29 in the through-hole 30A with the screw 29 being screwed into the screw hole 28A of the mounting seat 28.

Moreover, in the recess 15 of the lamp garnish 13, a clearance between the external side edge part 17S and the internal side edge part 17U is so formed as to be greater than the main body 14 so that the lamp 12 retained in the recess 15 can move in an inclined manner.

Furthermore, in the casing 21, a positioning screw 51 is screwed into the bottom wall part 14B in a position apart from the through-hole 30A, and the leading end of the positioning screw 51 abuts the casing 21. As the positioning screw 51 is rotated so as to adjust an abutting leading-end position of the positioning screw 51 relative to the casing 21, the inclination angle of the lamp 12 can be adjusted with reference to the positioning screw 51.

As explained above, according to the second embodiment, the same working and effect as those of the first embodiment can be accomplished. Moreover, correspondingly to claim 5, as the LEDs 23 which are the light-emission units of the lamp 12 are configured in such a way that an inclination angle relative to the lamp garnish 13 is adjustable, versatility can be ensured for vehicles having different specifications like a vehicle height by adjusting the inclination angle of the LEDs 23.

Third Embodiment

Figure 9:
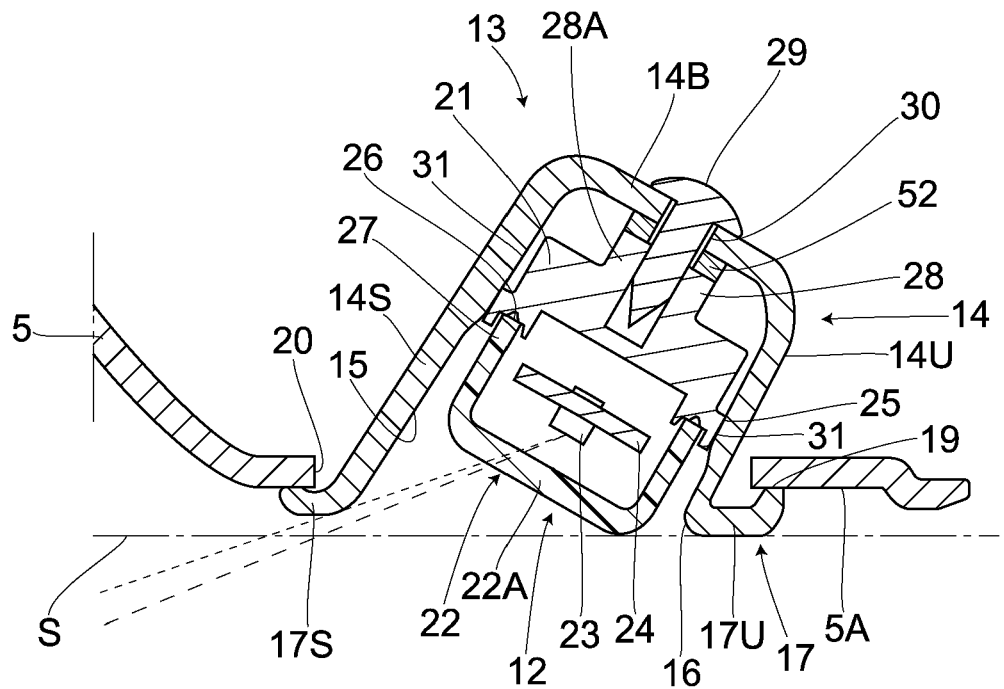
FIG. 9 is a cross-sectional view showing an attached state according to a third embodiment.
Figure 10:
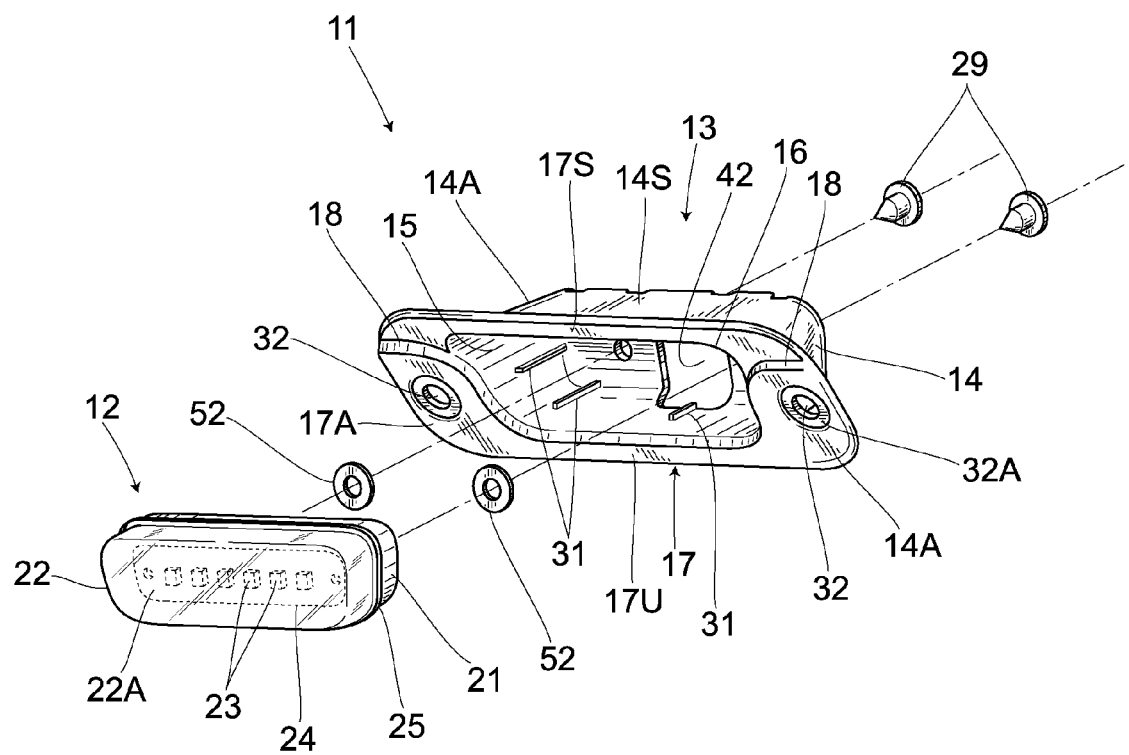
FIG. 10 is an exploded perspective view of the third embodiment.

FIG. 9 and FIG. 10 show a third embodiment of the present invention. The same structural element will be denoted by the same reference numeral as that of each of the foregoing embodiments, and the duplicated explanation thereof will be omitted. In the third embodiment, a position of the lamp 12 is adjusted in a depth direction of the recess 15 as a spacer 52 for adjusting a height is provided between the mounting seat 28 and the bottom wall part 14B, thereby making a clearance between the LEDs 23 in the lamp 12 and the edge 17 adjustable.

As explained above, according to the third embodiment, the same working and effect as those of each of the foregoing embodiments can be accomplished. Moreover, correspondingly to claim 6, as a clearance between the LEDs 23 which are the light-emission units and a face of the edge parts 17A, 17A is adjustable, versatility can be ensured for vehicles having different specifications like a vehicle height by adjusting the clearance between the face of the edge parts 17A, 17A and the LEDs 23.

Fourth Embodiment

Figure 11:
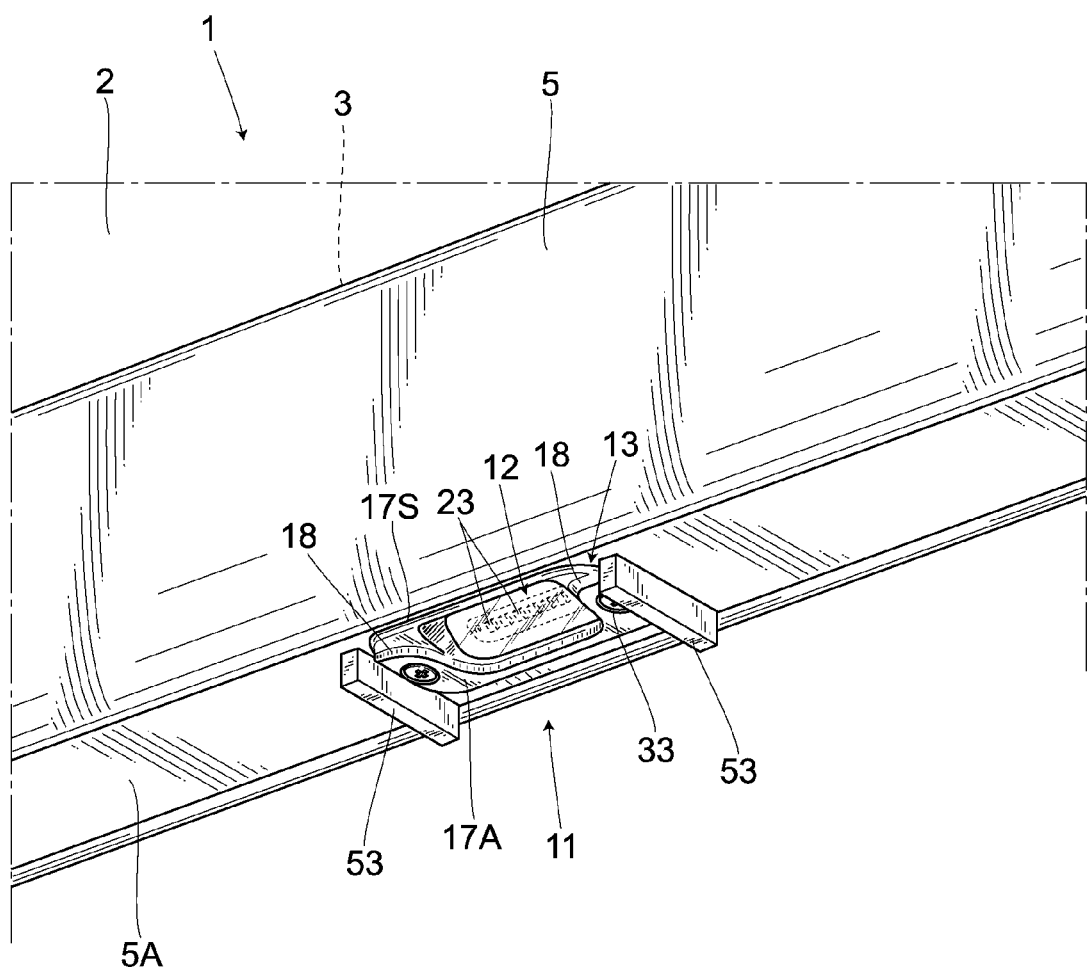
FIG. 11 is a perspective view showing an attached state according to a fourth embodiment.

FIG. 11 shows a fourth embodiment of the present invention. The same structural element will be denoted by the same reference numeral as that of each of the foregoing embodiments, and the duplicated explanation thereof will be omitted. In the fourth embodiment, tabular shielding parts 53, 53 are formed integrally with the front side edge part 17A of the lamp garnish 13 and the rear side edge part 17A thereof, respectively, and the shielding part 53 has a dimension in a right-and-left direction which is so formed as to be larger than the width of the recess 15 in the right-and-left direction.

As explained above, in order to prevent the lamp 12 from becoming dirty by mud splashed by a front wheel, the shielding part 53 in a wall-like shape is provided on the lamp garnish 13 as a splash guard. In order to suppress any splashed mud from the front wheel, it is sufficient to provide the blocking part 53 only on the front side edge part 17A in an attached state, but if the shielding parts 53, 53 are provided on the front and rear, the illumination device 11 can be commonly used for right and left.

As explained above, according to the fourth embodiment, the same working and effect as those of each of the foregoing embodiments can be accomplished. Moreover, correspondingly to claim 7, the shielding part 53 is provided on the edge 17, so that the lamp 12 can prevent from becoming dirty and being damaged.

Fifth Embodiment

Figure 12:
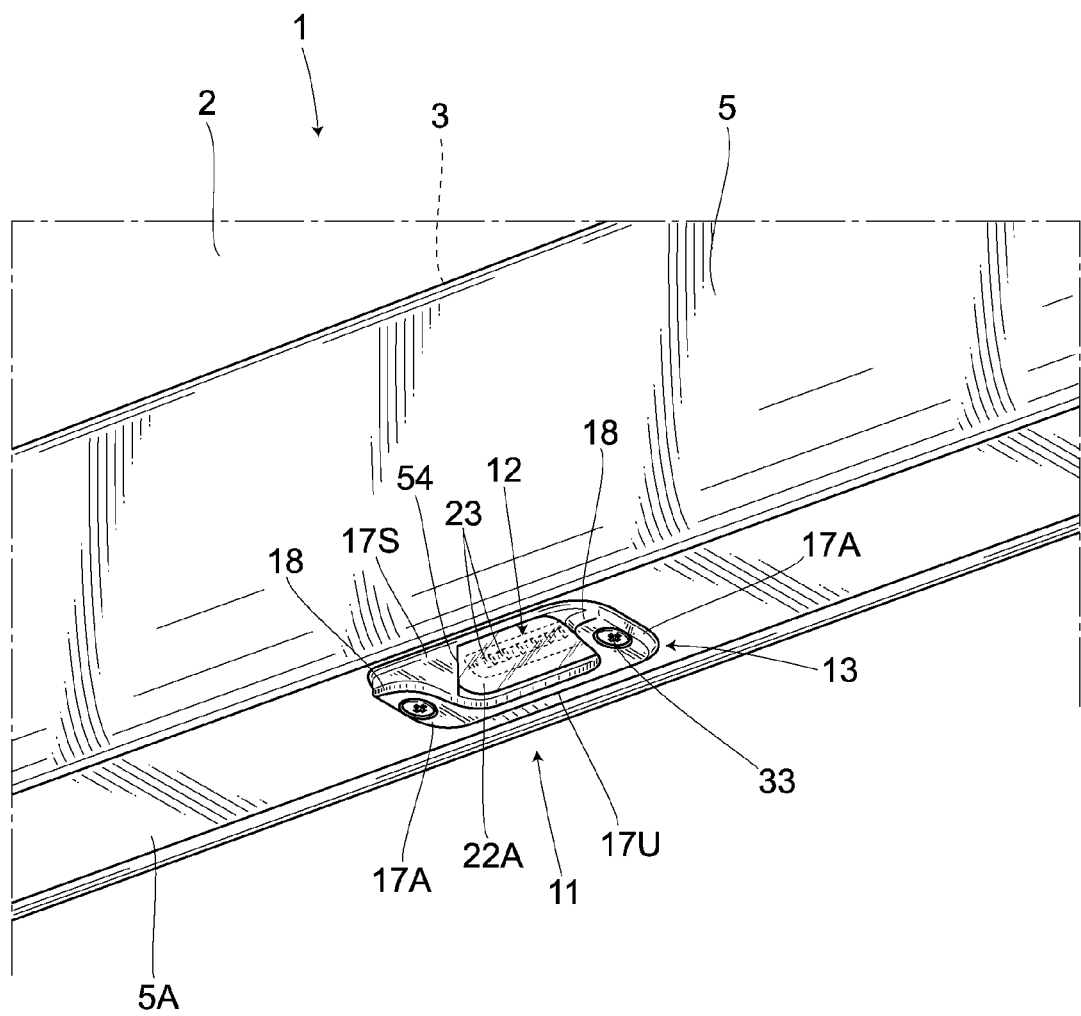
FIG. 12 is a perspective view showing an attached state according to a fifth embodiment.
Figure 13:
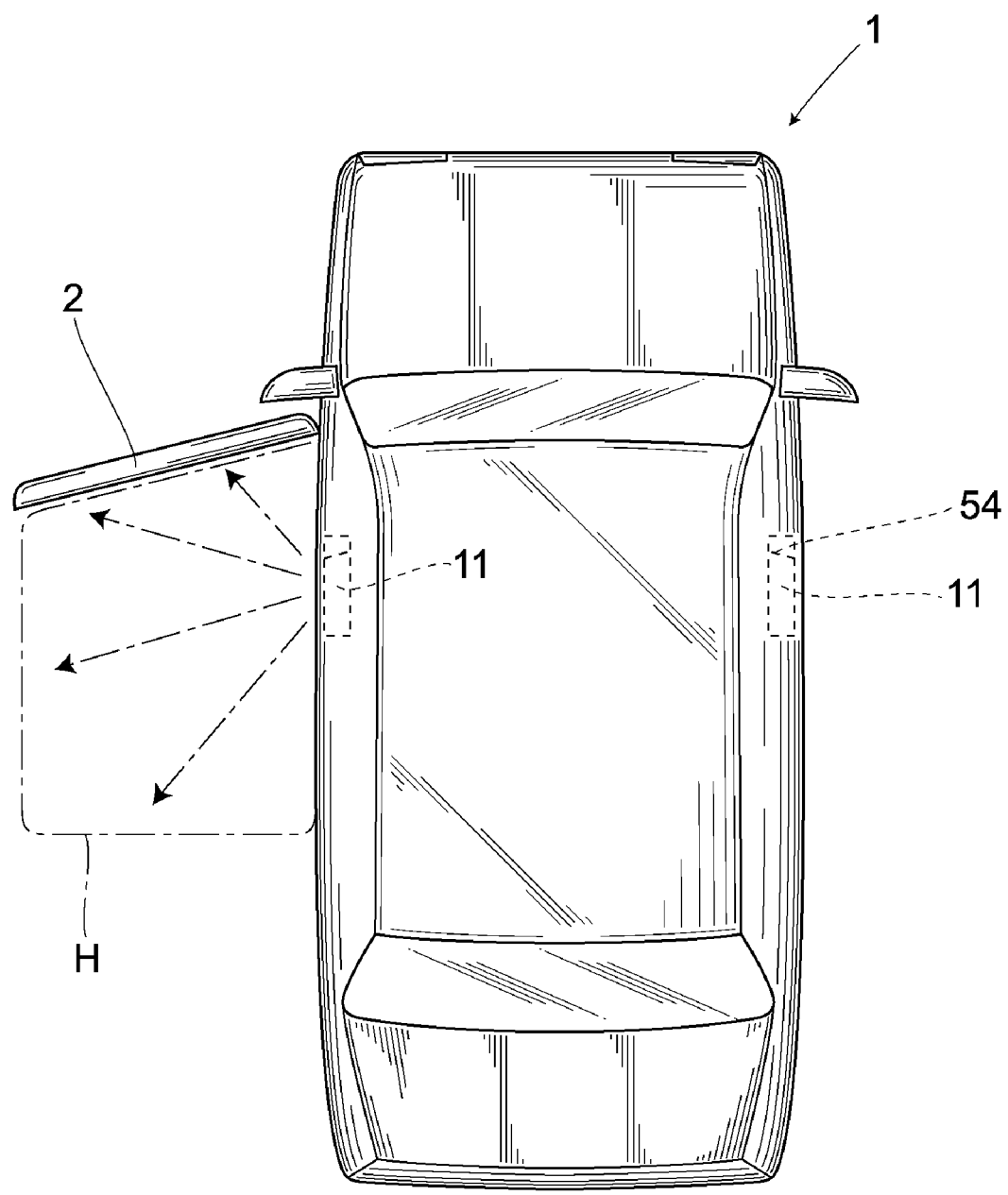
FIG. 13 is a plan view for explaining a vehicle according to the fifth embodiment.

FIG. 12 and FIG. 13 show a fifth embodiment of the present invention. The same structural element will be denoted by the same reference numeral as that of each of the foregoing embodiments, and the duplicated explanation thereof will be omitted. In the fifth embodiment, a light-blocking part 54 is partially provided on the opened part 16 of the lamp garnish 13. The light-blocking part 54 is provided at a corner part at the vehicle-front side of the opened part 16 and at the external side thereof, and is configured so as to illuminate an underfoot floor range H corresponding to an open/close range of the door 2 in a fully-opened state.

As explained above, as the lamp garnish 13 is formed in a shape corresponding to an open/close state of the door 2 of the vehicle 1, irradiation of light to the internal face or the like of the door is blocked, thereby accomplishing illumination which facilitates recognition of the range where the door 2 opens.

Sixth Embodiment

Figure 14:
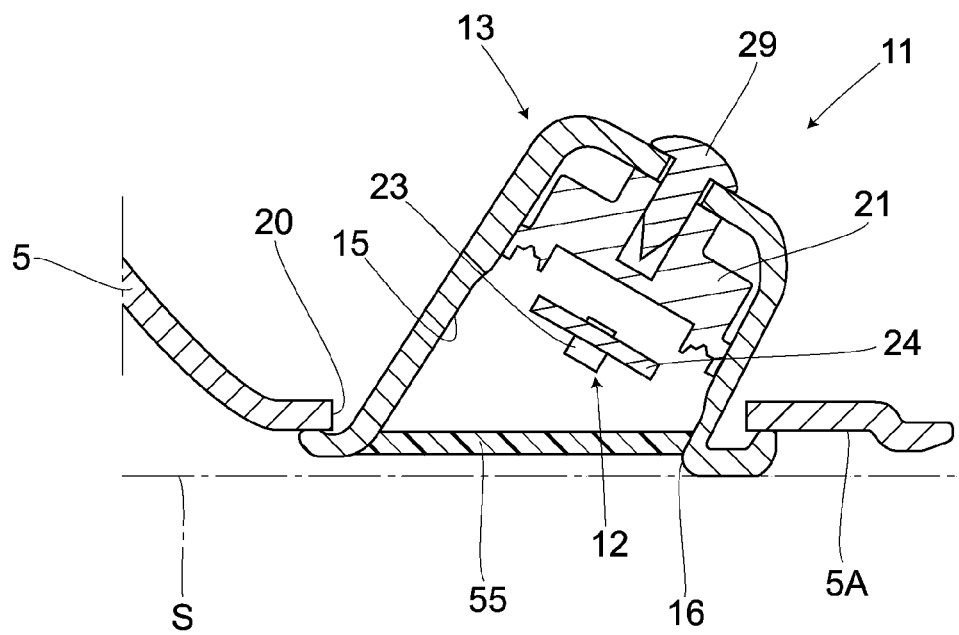
FIG. 14 is a cross-sectional view of a sixth embodiment.

FIG. 14 shows a sixth embodiment of the present invention. The same structural element will be denoted by the same reference numeral as that of each of the foregoing embodiments, and the duplicated explanation thereof will be omitted. In the sixth embodiment, a lens 55 is provided in the opened part 16 of the lamp garnish 13. Moreover, it is not necessary to use the translucent cover 22 as the opened part 16 is blocked by the lens 55 which diffuses light. Note that a lower face of the lens 55 is aligned with a lower face of the vehicle external side edge part 17S.

As explained above, as the lens 55 is arranged at a position substantially same as a front face (a lower face in an attached state) of the edge 17 of the lamp garnish 13 or at a position near the front face thereof, wide light distribution is acquired even if the opened part 16 is narrow, so that the size of the vehicular illumination device 11 can be reduced, thereby enhancing versatility.

Seventh Embodiment

Figure 15:
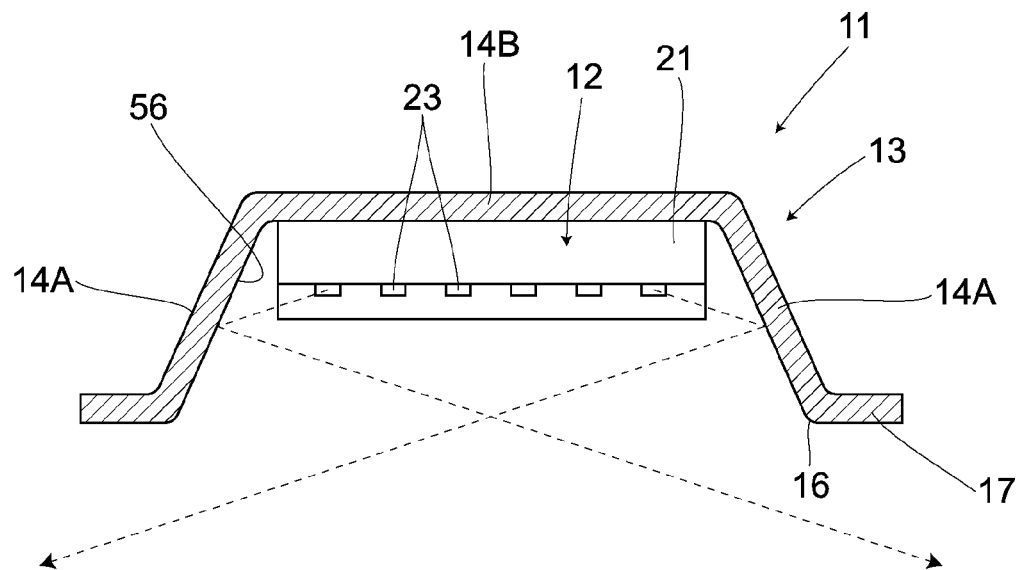
FIG. 15 is a cross-sectional view of a seventh embodiment.

FIG. 15 shows a seventh embodiment of the present invention. The same structural element will be denoted by the same reference numeral as each of the foregoing embodiments, and the duplicated explanation thereof will be omitted. In the seventh embodiment, a light reflecting face 56 is provided on an internal face of the main body 14 of the lamp garnish 13. In this case, the light reflecting face 56 can be configured by applying a mirror surface treatment to the internal face of the main body 14 of the lamp garnish 13 formed of a synthetic resin, or the light reflecting face 56 can be configured by applying a mirror finishing to the lamp garnish 13 formed of stainless-steel or the like.

As explained above, as the mirror surface treatment is applied to the internal face of the lamp garnish 13, or as the lamp garnish 13 is formed of a metal like stainless-steel which may reflect light, wide light distribution is acquired even if the opened part 16 is narrow.

The present invention is not limited to the embodiments, and can be changed and modified in various forms without departing from the scope and spirit of the present invention. For example, various light-emitting units other than the LEDs can be used. Moreover, it is needless to say that the external component is not limited to the one in the embodiments, and can be a side under spoiler or the like.

What is claimed is:

1. A vehicular illumination structure, comprising:
   a side sill configured to be disposed on a lower part of a vehicle body below a door opening, said side sill having a mounting hole formed in a lower face thereof,
   a lamp housing which retains a lamp, the lamp housing including a main body housing the lamp and an abutting part,
   wherein the main body of the lamp housing is inserted into the mounting hole of the side sill from underneath, and
   wherein the lamp housing is attached to the side sill by abutting the abutting part of the lamp housing on the lower face of the side sill.

2. The vehicular illumination structure according to claim 1,
   wherein the main body of the lamp housing has a box shape with a lower part of the box shape being opened,
   wherein the lamp housing further includes a recess which is formed by an internal face of said main body and edge parts formed around an opened-part of the recess, the edge parts being integral with the main body,
   wherein the abutting part is formed around the edge part, and
   wherein the lamp is arranged in the recess such that a light-emission face of the lamp is arranged inwardly of a face of the edge parts.

3. The vehicular illumination structure according to claim 2, wherein in a state where the lamp housing is attached to the lower face of the side sill, a position of a first edge part, disposed at a vehicle external side of the side sill, is higher than a position of a second edge part, disposed at a vehicle internal side of the side sill.

4. The vehicular illumination structure according to claim 1,
   wherein a light-emission unit of the lamp is inclined toward the exterior of the vehicle, and
   wherein the light-emission face of the lamp is positioned inwardly relative to a face of the lamp housing between the front and rear edge parts of the lamp housing.

5. The vehicular illumination structure according to claim 2,
   wherein a light-emission unit of the lamp is inclined toward the exterior of the vehicle, and
   wherein the light-emission face of the lamp is positioned inwardly relative to a face of the lamp housing between the front and rear edge parts of the lamp housing.

6. The vehicular illumination structure according to claim 3,
   wherein a light-emission unit of the lamp is inclined toward the exterior of the vehicle, and
   wherein the light-emission face of the lamp is positioned inwardly relative to a face of the lamp housing between the front and rear edge parts of the lamp housing.

7. The vehicular illumination structure according to claim 2, wherein a light-emission unit of the lamp has an inclination angle adjustable relative to the lamp housing.

8. The vehicular illumination structure according to claim 3, wherein a light-emission unit of the lamp has an inclination angle adjustable relative to the lamp housing.

9. The vehicular illumination structure according to claim 2, wherein a light-emission unit of the lamp has a clearance between a face of the edge parts and the light-emission unit which is adjustable.

10. The vehicular illumination structure according to claim 3, wherein a light-emission unit of the lamp has a clearance between a face of the edge parts and the light-emission unit which is adjustable.

11. The vehicular illumination structure according to claim 2, wherein said side sill includes a tabular shielding part integrally provided at the front and rear edge parts of the lamp housing, relative to the direction of the vehicle.

12. The vehicular illumination structure according to claim 3, wherein said side sill includes a tabular shielding part integrally provided at the front and rear edge parts of the lamp housing, relative to the direction of the vehicle.

13. The vehicular illumination structure according to claim 2, wherein the lamp comprises a casing, a translucent cover which is attached to the casing, and a light-emission unit which is attached in the casing.

14. The vehicular illumination structure according to claim 3, wherein the lamp comprises a casing, a translucent cover which is attached to the casing, and a light-emission unit which is attached in the casing.

\* \* \* \* \*